May 3, 1966     G. G. A. BOLIN     3,248,990
PIANO TONE PRODUCING STRUCTURE

Filed April 11, 1962     6 Sheets-Sheet 1

INVENTOR.
GUSTAV GEORG ARNE BOLIN
BY

*Mason, Fenwick & Lawrence*
ATTORNEYS

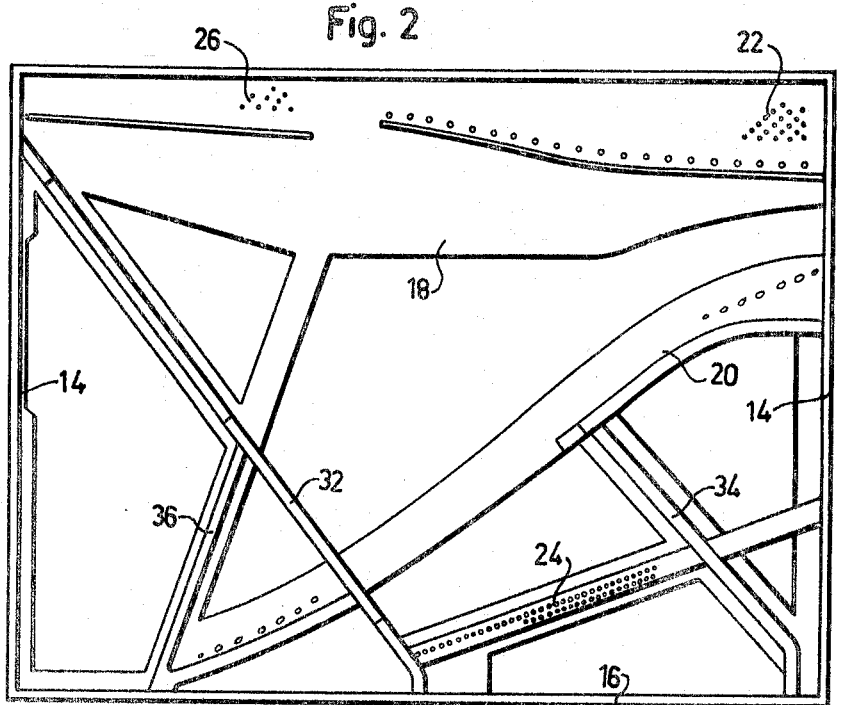

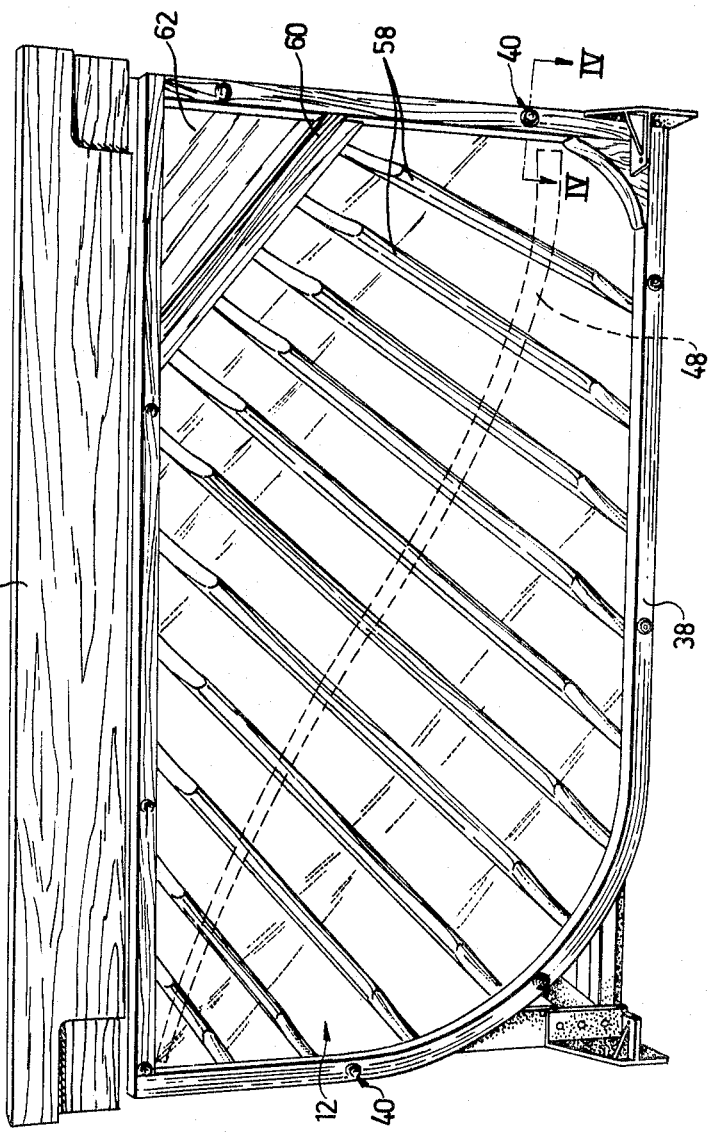

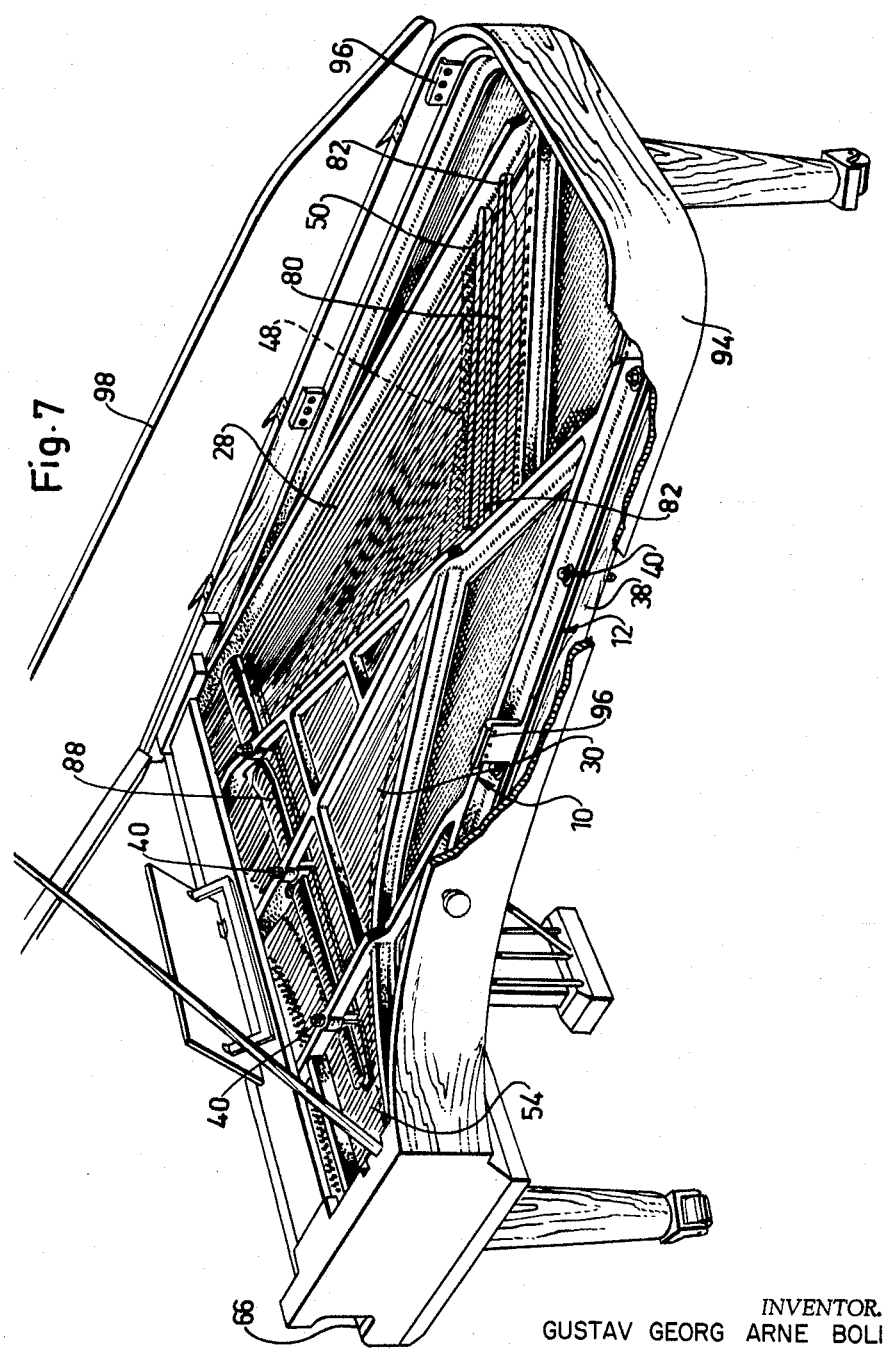

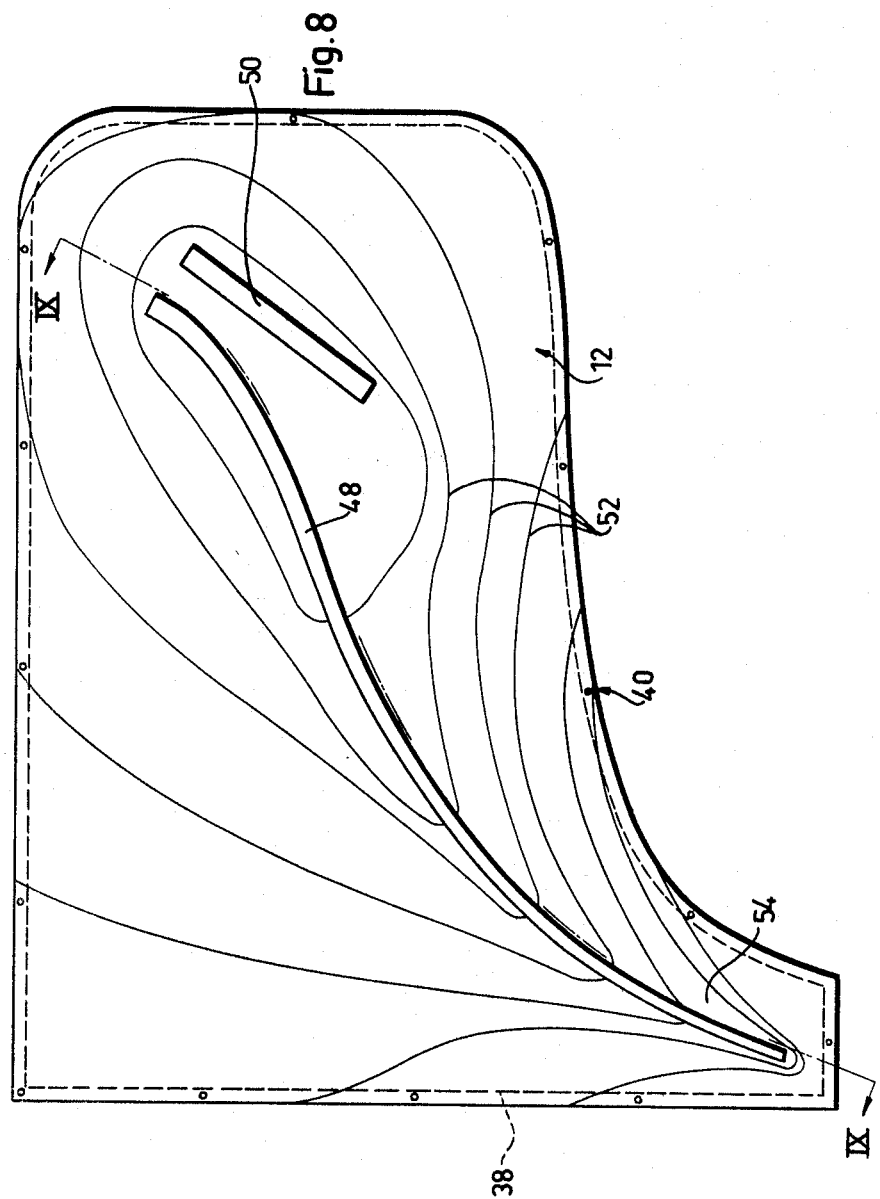

May 3, 1966   G. G. A. BOLIN   3,248,990
PIANO TONE PRODUCING STRUCTURE
Filed April 11, 1962   6 Sheets-Sheet 6

INVENTOR.
GUSTAV GEORG ARNE BOLIN
BY
ATTORNEYS

United States Patent Office 3,248,990
Patented May 3, 1966

3,248,990
PIANO TONE PRODUCING STRUCTURE
Gustav George Arne Bolin, 4 Lirovagen,
Roslags-Nasby, Sweden
Filed Apr. 11, 1962, Ser. No. 186,792
Claims priority, application Sweden, Apr. 12, 1961,
3,855/61
8 Claims. (Cl. 84—189)

This invention relates to pianos.

Pianos which are generally understood to be instruments provided with a keyboard with keys which on actuation are adapted through an action to cause hammers to strike strings. To each key a string having its individual tone corresponds. Co-operating with the strings is a sounding board provided with bridges to modify and amplify the tone impulse produced by the string.

One main object of the invention is to provide an instrument of the type set forth which possesses great selectivity and is rich in overtones and thereby possesses extraordinarily great capacity of modulation.

Another object of the invention is to provide an instrument which is adapted to be manufactured in series production while ensuring high quality as a standard of each individual piece, the manufacturer thus not being dependent on chance for the quality of the tones.

A further object of the invention is to provide an instrument, the strings of which may be equalized under a relatively equal distribution of the tension existing therein, thereby increasing their life and improving the instrument keeping its tune better than has been the general standard hitherto.

Still another object of the invention is to provide an instrument the members of which supporting the strings are entirely independent as to their stability and strength of the case enclosing the instrument so that said members constitute an independent unity relative said case. Thus in particular the rear portion of the case has no supporting function at all and can be dispensed with, if desired.

Further objects and advantages of the invention will become apparent from the following description, considered in connection with the accompanying drawings, which form part of this specification, and of which:

FIG. 2 is a front view of a frame forming part of the piano.

FIG. 3 is a rear view of a sounding board.

FIG. 4 is a sectional view in an enlarged scale following line IV—IV of FIG. 3.

FIG. 7 is a perspective view of a grand piano constructed according to the invention and with parts of the case assumed cut away.

FIG. 8 is a top view of a sounding board forming part of the grand piano.

Figure 1:
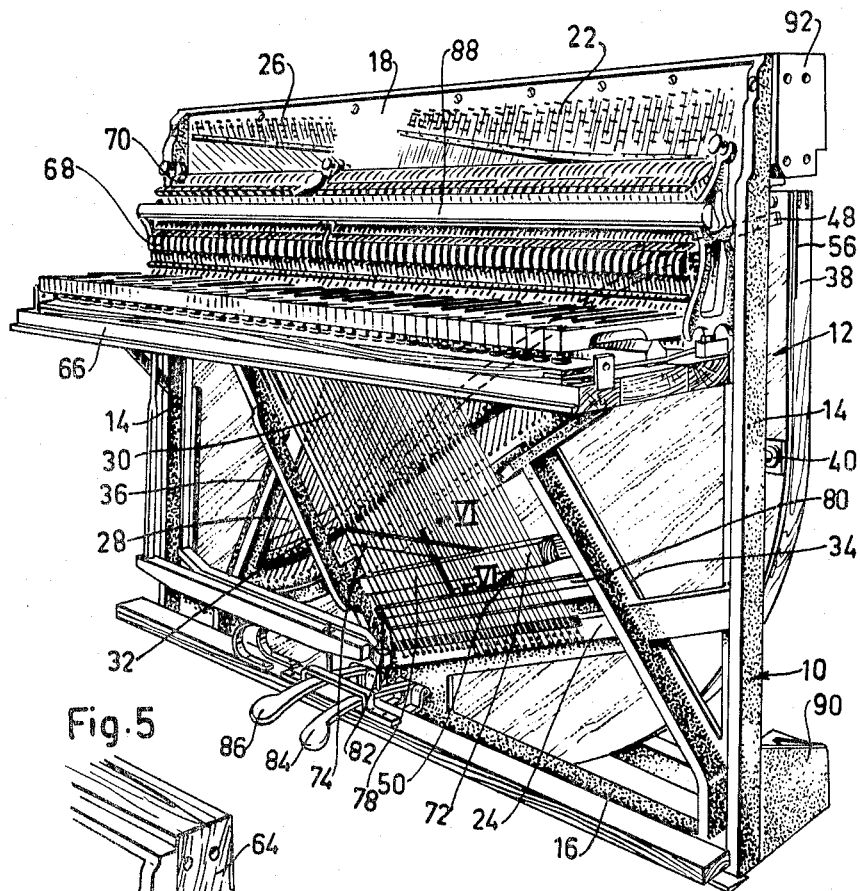
FIG. 1 is a perspective view of an upright piano constructed according to the invention and shown without the case.
Figure 5:
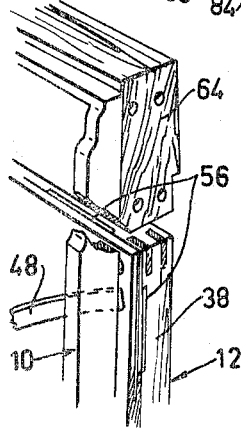
FIG. 5 is a perspective view in an enlarged scale of an upper edge portion of the frame and the sounding board.
Figure 6:
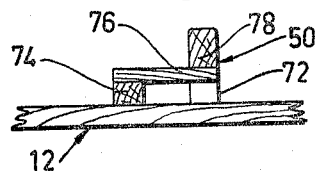
FIG. 6 is a sectional view following line VI—VI of FIG. 1.
Figure 9:
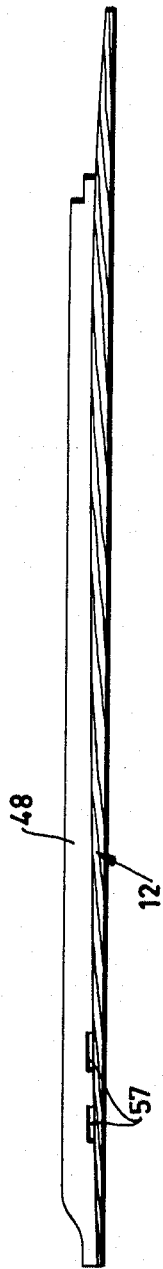
FIG. 9 is a sectional view following line IX—IX of FIG. 8 of a sounding board with bridge for the upper register.
Figure 10:
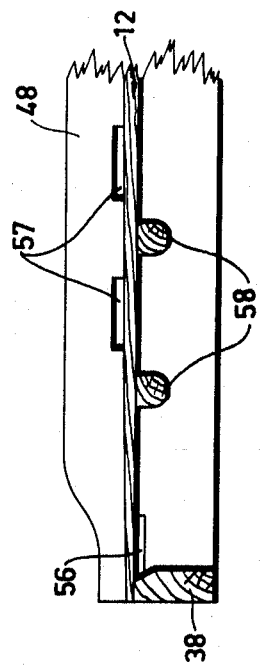

FIG. 10 finally is a similar sectional view of a portion of FIG. 9 represented in a larger scale and showing details which had been excluded in FIG. 8.

In the drawings the same reference numerals have been used for the same or equivalent parts.

The embodiment of the invention shown in FIGS. 1 to 6 comprises a frame 10 and a sounding board 12 supported by said frame. This frame is composed of two lateral members 14, a base member 16 and a top member 18. Moreover, a bar 20 is provided between said members, the strings of the upper register being fixed between said bar and a portion 22 of the top member. The strings of the lower register are fixed between another bar 24 and a portion 26 of the top member. The two groups 28 and 30, respectively, of strings are located in different planes, as will become evident in particular from FIG. 1. Bars 32 and 34 extend in substantially parallel relation to one another on either side of the strings 30 of the lower register. The bar 32 is with its ends rigidly secured to the base member 16 of the frame and the upper portion of one of the lateral members 14. The bar 34 projects from the opposite edge of the frame to the bar 20. A further bar 36 traverses the bar 32 and interconnects the horizontal top and base parts of the frame 10. The bar 36 extends in parallel with the adjacent strings of the group of the upper register 28. The frame with its different bar is manufactured of iron or steel pieces joined together by welding which imparts to the frame an excellent stability or structural strength. Due to this stability of the frame the rear piece made of wood which has been usual hitherto, may be dispensed with, the frame acting as a supporting body, around which the sounding board for the strings and the case are built up. By the feature that the welded metal frame retains its form, the advantage is obtained that the deterioration of the quality of the sound and other acoustic phenomena deteriorating the quality and hitherto often encountered after use of the instrument for a shorter or longer period of time, are eliminated. The welded frame further has the advantage that different portions may be made of materials possessing different properties. Thus the bars or braces 20, 32, 34 and 36, which are exposed to particularly great stresses, may be of a material of higher quality than the other portions of the frame.

The sounding board 12 has for its object in a piano to distribute and convert and also to amplify the tone produced by the string so as to entail to it the desired tone color. The sounding board is made of wood and is united by gluing with a rim or border 38 also made of wood. This rim is arranged on the rear or back of the sounding board. The sounding board is supported in spaced relation thereto by the frame 10 by means of a limited number of screw connections generally designated by 40. In the embodiment according to FIGS. 1 to 4 the number of screw connections is 9, but it may vary between 6 to 7 and 11 to 12. Each screw connection comprises a bolt 41 one end portion denoted 42 of which is formed to be introduced by screwing into a bore 43 formed in the frame 10, a nut 45 being screwed on the other end portion of said bolt. Rigidly secured to the bolt 41 is a shoulder 46 against which the sounding board seats and from which the bolt projects through the rim 38. The bolt has an end portion 47 formed with a square section for application of a key by means of which the bolt can be rotated when the nut 45 has been loosened, the position of the bolt and therewith that of the sounding board 12 relative the frame being adjusted thereby. After the sounding board has been given the desired distortion around one screw connection 40 the nut 45 thereof is tightened to fix the sounding board in its correct position around said connection.

In this way the sounding board is by varying adjustment of the individual screw connections 40 adjustable to obtain correct distribution of its tension with regard to the acoustic-physical conditions and thus lockable in a static position advantageous for the sound and tone color. This feature has an extraordinarily favorable influence on the quality of the tones produced by the instrument.

Secured by gluing on to the sounding board is a strip, the belly bridge 48 of the upper register (see also FIG. 7) over which the strings of the group of the upper register 28 pass for transfer of the tone to the board. A similar belly bridge 50 of greater height serves for the same purpose with regard to the strings of the group of the lower register 30.

It is known in prior art to give the sounding board a convex shape viewed from the side of the strings in order to counteract the pressure exerted by the strings on the bridges 48, 50 and to produce a good dispersion of the tone. It has in this connection hitherto always been customary to dimension the sounding board in accordance with the theory that by making the board thinner the tone becomes lower and deeper while by making the board thicker the tone in the board mass becomes higher. In accordance therewith the sounding board was made thinner in the zone of the lower register and thicker in the zone of the upper register. This theory has, however, proved to be untenable, since a tone with low frequency is stronger from the dynamic point of view and tolerates or demands a greater mass resistance whereas a tone with high frequency is weaker in power and therefore tolerates or demands a smaller mass resistance. According to the invention the sounding board is made thinner particularly in the zone of the higher tones of the upper register than in the zone of the lower register. In this way there is obtained a bass tone produced more correctly and possessing a more exact course of intonation and a clearer treble richer in overtones than obtainable with conventional constructions. The shape of the sounding board becomes especially evident in FIG. 8 wherein curves 52 indicate level lines simulating contour lines of a similar character as in a map. In FIG. 8 the difference in level between adjacent level lines is 0.5 mm. It is easily understood from said level lines that the thickest zone is located adjacent or underlying the lower register belly bridge 50 which thus mediates the transfer of the tone from the group 30 of strings of the lower register to the sounding board. Located adjacent or underlying this thickest zone is also that part of the bridge 48 of the upper register 28 on which bear the strings of the upper register group 28 producing the lowest tones. The thickness of the sounding board progressively towards and beyond the part 54 of said group of level lines 52 which means that the place where the highest tones of the upper register are transferred to the sounding board the latter is of minimum thickness. The thickness of the sounding board further decreases in a transverse direction on both sides of the bridge 48 for the upper register 28.

In order additionally to decrease the mass resistance of the sounding board to vibration in the zone of the upper register, the border 38 is formed with spaced openings 56 in front of which the sounding board is laid open in the upper register zone. The bridge 48 may also be formed with one or several recesses 57 adjacent said zone. Preferably the bridge 48 has a varying breadth so as to be larger in the lowest register zone than in the upper register zone of the sounding board, as will be seen from FIG. 8.

Due to the particular shape according to the invention of the frame 10 in the embodiment according to FIGS. 1–6, the cross-bar of the upper register can be discarded. This cross-bar is in conventional constructions constituted by a prolongation of the bar 34 reaching the top member 18 and therefore traversing the bridge 48 which for this reason has to be formed with a recess, which recess created the well-known problem of the cross-bar tones.

The sounding board is on its suitably plane rear face provided with ribs 58 (see especially FIG. 3) which cross the direction of the fibers in the board and which according to another feature characterizing the invention extend in a fan-shaped manner so as to diverge in a downward direction from the top. This feature assists in improving the internal distribution of the tone by the sounding board. Adjacent the lower register the rim 38 is provided with a reinforcing edge bar 60 which screens off a portion 62 of the sounding board 12 so as to render it more or less inactive acoustically. The portion 62 may according to the invention be given a desired distortion by adjustment of the adjacent screw connections 40 which especially contributes in locating the sound center of the sounding board to the most advantageous place in each individual case to obtain desired selectivity.

Provided on the rear face of the top member 18 of the frame is a wrest-plank 64 (FIG. 3). This wrest-plank is thus exactly in front of the portions 22, 26 in which the tuning pins fixing the upper end portions of the strings are set. These tuning pins are known per se and will therefore not be described more particularly here.

The bridge 50 of the lower register has a portion 72 which is directly united with the sounding board 12. This portion comprises approximately one half of the total length of the bridge and co-operates with those strings of the group of the lower register 30 which comprise the part thereof that has the highest frequency. The remaining portion 78 of the bridge 50 is free from direct contact with the sounding board and is carried by an auxiliary bridge comprising a bar 74 rigidly secured to the sounding board and a plate 76 interconnecting said bar with the belly bridge 50. As is seen from FIG. 1, the bar 74 forms an angle with the bridge 50, and the plate 76 has a corresponding triangular shape.

The portion 78 of the belly bridge 50 supported by the auxiliary bridge is always spaced from the sounding board 12 and at the same time increases the length of the lever arm represented by the plate 76 in a direction toward the bass tones having the lowest frequency. The intention is to increase the possibility of vibration for the strings having the lowest frequency by displacing the support points for the portion 78 of the belly bridge 50 upwards into spaced relation to the lower edge of the sounding board 12. Such shape of the bridge 50 of the lower register is known in principle, but hitherto the belly bridge was supported over its entire length by the inclined auxiliary bridge. According to the invention said auxiliary bridge has been shortened and therewith also its lever arm resulting in the sounding board being less exposed to tensile stresses than hitherto in the zone around the bridge of the lower register.

Disposed between the bridge 50 of the lower register and the lower fixing points of the bass string group 30 of the lower register in the bar 24 is a rear bridge 80 resting on the portions 32 and 34 of the frame and adjustable perpendicularly to the sounding board 12 by means of screws 82 positioned in both ends which thus bear on said bars of the frame. By means of said rear bridge 80 the pressure exerted by the strings on the bridge 50 of the lower register 30 may be increased or decreased which also has a favorable influence on the operation of the sounding board.

The frame 10 and therewith also the sounding board 12 are slightly inclined rearwards. The angle of inclination amounts to between 5 and 6° and is preferably 5.5°. By this inclination a concentration of the highest overtones is obtained and i.e., the problem of stationary waves between wall, floor and ceiling is avoided.

The frame 10 further carries a key board 66 and an action 68 which transfers the movement of the keys to a hammer 70 so as to cause this latter to strike the strings. These and other parts of the piano such as the pedals 84, 86 and the damper list 88 are of well known structural build and will therefore not be described here in detail. The piano is usually mounted on wheels positioned in brackets 90 on either side of the base of the piano. Upper brackets 92 are intended to secure the case determining the external contour of the piano.

In the embodiment shown in FIG. 7 the frame 10 is principally constructed in the same manner as described hereinbefore. The sounding board 12 has belly bridges 48, 50 of which the latter over its entire length directly bears on the sounding board. In the same manner as in the preceding embodiment the frame 10 forms together with the sounding board an individual unit which is totally independent of the case 94 of the grand piano. The frame and the sounding board together with the strings are thus assembled to constitute an altogether finished unit which by means of fittings 96 is suspended in the case 94. To the latter a hinged top or cover 98 is attached. The number of screw connections 40 may be greater in the grand piano, such as between 10 and 15.

With regard to the shape of the frame 10 a difference from the constructions known in prior art consists in that the damper list 88 is carried by the frame proper.

While several more or less specific embodiments of the invention have been shown and described, it is to be understood that this is for the purpose of illustration only, and that the invention is not to be limited thereby, but its scope is to be determined by the appended claims.

What I claim is:

1. In a piano, frame means for supporting a plurality of tonal strings under tension to provide at least an upper register including strings having a range of relatively high and low frequencies,
   a sounding board supported by said frame having an elongated belly bridge thereon with the strings of said register in bearing relation therewith,
   said sounding board being of varying thickness and having an elongated area of maximum uniform thickness disposed in one end portion thereof, the thickness of said sounding board progressively decreasing outwardly from both sides and end portions of said area of maximum uniform thickness,
   said elongated belly bridge having an end portion mounted on and extending generally longitudinally of said elongated area of maximum thickness with the remainder portion of said bridge extending toward and adjacent the area of minimum thickness at the opposite end portion of said sounding board.

2. A construction as defined in claim 1 wherein said sounding board progressively decreases in thickness perpendicularly outwardly from both sides of the entire length of said bridge and includes elongated areas of uniform thickness extending along portions of the length of said bridge.

3. In a piano, frame means for supporting a plurality of tonal strings under tension to provide a range of relatively high and low frequencies for upper and lower register portions thereof, respectively, at opposite end portions of said frame means,
   a sounding board associated with all of said strings and having a pair of belly bridges mounted thereon, and wherein said bridges, respectively, have bearing support with each of said upper and lower register string portions and wherein said lower register bridge is of a much shorter length than said upper register bridge,
   said lower register bridge being positioned adjacent to and abreast of said upper register bridge at one end thereof and at one end portion of said sounding board,
   said sounding board having portions of graduated thickness with a portion of constant maximum thickness being at said one end thereof and uniformly underlying the entire extent of the lower register bridge and the lower tonal portion of said upper register bridge.

4. A construction as defined in claim 3 wherein said sounding board progressively decreases in thickness perpendicularly outwardly from the constant maximum thick portion thereof mounting said lower register bridge in its entirety and the lower tonal portion of said upper register bridge and outwardly to the end of the upper portion of said upper register bridge where the strings providing tones of the highest frequencies are located.

5. A construction as defined in claim 3 wherein said upper register bridge is provided with spaced recesses therein adjacent the sounding board within the zone of the strings producing tones having the highest frequencies to thereby reduce the surface area of the upper register bridge bearing on said sounding board.

6. A construction as defined in claim 3 wherein said sounding board includes a thickened rim member cemented thereon along its periphery and solely at the underside thereof remote from said belly bridges,
   said rim member in the zone of the strings of the upper register having spaced openings therein adjacent the sounding board.

7. In a piano, a multi-part welded metallic frame structure for supporting tonal strings under tension to produce tones of different frequencies,
   a sounding board supported by said frame structure and including a rim mounted solely on the periphery of its side remote from said frame structure,
   belly bridge means on said sounding board for transmitting the vibrations of the tonal strings to the sounding board,
   means mounting and maintaining said sound board in spaced relation to said metallic frame structure,
   said means comprising a plurality of elongated screw members mounted for axial adjustment in spaced relation on said frame structure,
   said screw members including means thereon for maintaining said sounding board and rim thereon spaced at all times from said frame structure,
   and means for effecting said axial adjustment of said screw members to vary the said spacing of said sounding board to obtain a desired distribution of tension therein to adjust for tone quality and tone color under varying acoustical-physical conditions.

8. In a piano, a metallic frame structure for supporting tonal strings under tension and having a bar adjacent one end thereof to which strings producing tones of the lower frequencies are anchored,
   a sounding board supported by said frame structure having a lower register belly bridge secured thereon for the engagement with the strings producing tones of the said lower frequencies,
   a rear bridge positioned between said belly bridge and said bar,
   means mounting said rear bridge for adjustment perpendicularly of said sounding board for contacting the tonal strings engaging said lower register belly bridge to adjustably vary the pressure of the tonal strings on the latter and to thereby influence the functional characteristics of said sounding board.

References Cited by the Examiner

UNITED STATES PATENTS

| | | | |
|---|---|---|---|
| 419,842 | 1/1890 | Dewing | 84—192 |
| 572,897 | 12/1896 | Howe | 84—192 |
| 717,600 | 1/1903 | Norcross | 84—184 |
| 1,171,921 | 2/1916 | Bauer | 84—187 |
| 1,727,637 | 9/1929 | Disler | 84—192 |
| 2,070,391 | 2/1937 | Bilhuber | 84—192 |
| 2,071,992 | 2/1937 | White et al. | 84—184 |
| 2,529,862 | 11/1950 | Bilhuber | 84—192 X |
| 2,800,049 | 7/1957 | Anderson et al. | 84—187 |

FOREIGN PATENTS

| | | |
|---|---|---|
| 57,569 | 7/1891 | Germany. |
| 75,572 | 9/1949 | Sweden. |

LEO SMILOW, *Primary Examiner.*

LOUIS J. CAPOZI, *Examiner.*

C. M. OVERBEY, *Assistant Examiner.*